United States Patent [19]

Burlison et al.

[11] 4,243,164
[45] Jan. 6, 1981

[54] GAME DRAGGING DEVICE

[76] Inventors: Larry J. Burlison, 7038 N. 3rd St., Turner, Oreg. 97392; Dale E. Burlison, Rt. 1, Box 66, Jefferson, Oreg. 97352

[21] Appl. No.: 919,427

[22] Filed: Jun. 26, 1978

[51] Int. Cl.³ .................................... B65D 71/00
[52] U.S. Cl. ................................. 224/52; 224/921; 294/74
[58] Field of Search ............ 224/55, 56, 57, 58, 224/52, 54, 45 S, 45 P, 45 R, 7 R, 7 A, 103, 50, 921; 248/201, 317; 24/243 E, 277, 81 CC; 294/74, 31.2; 16/111 R, 114 R

[56] References Cited

U.S. PATENT DOCUMENTS

| | | | |
|---|---|---|---|
| 676,895 | 6/1901 | Hoffheins | 24/243 E |
| 747,606 | 12/1903 | Hildebrandt | 224/7 |
| 954,859 | 4/1910 | Gooley | 24/243 E |
| 1,257,872 | 2/1918 | Jentz | 24/243 E |
| 2,394,805 | 2/1946 | Reishus | 224/7 A |
| 2,407,172 | 9/1946 | McMillan | 224/58 |
| 2,738,113 | 3/1956 | Sigler | 224/45 R |
| 3,188,130 | 6/1965 | Pietlowicz | 224/7 A |
| 3,367,056 | 2/1968 | Johnson | 224/45 R |

FOREIGN PATENT DOCUMENTS 713873  11/1941  Fed. Rep. of Germany ............ 224/52

*Primary Examiner*—Robert J. Spar
*Assistant Examiner*—Kenneth Noland
*Attorney, Agent, or Firm*—Eugene M. Eckelman

[57] ABSTRACT

A rigid hand bar has a pair of spaced clamp loops which are adjustable for releasable securement on front leg portions of a dead game animal. The animal can be dragged after first securing the bar to its front legs and then grasping and pulling the bar. A line secured to the bar is arranged to loop under and support the head portion of the animal so that it will not drag on the ground. The hand bar may have a central gripping area for use by one man or it may have opposite end gripping areas for use by two men.

3 Claims, 3 Drawing Figures

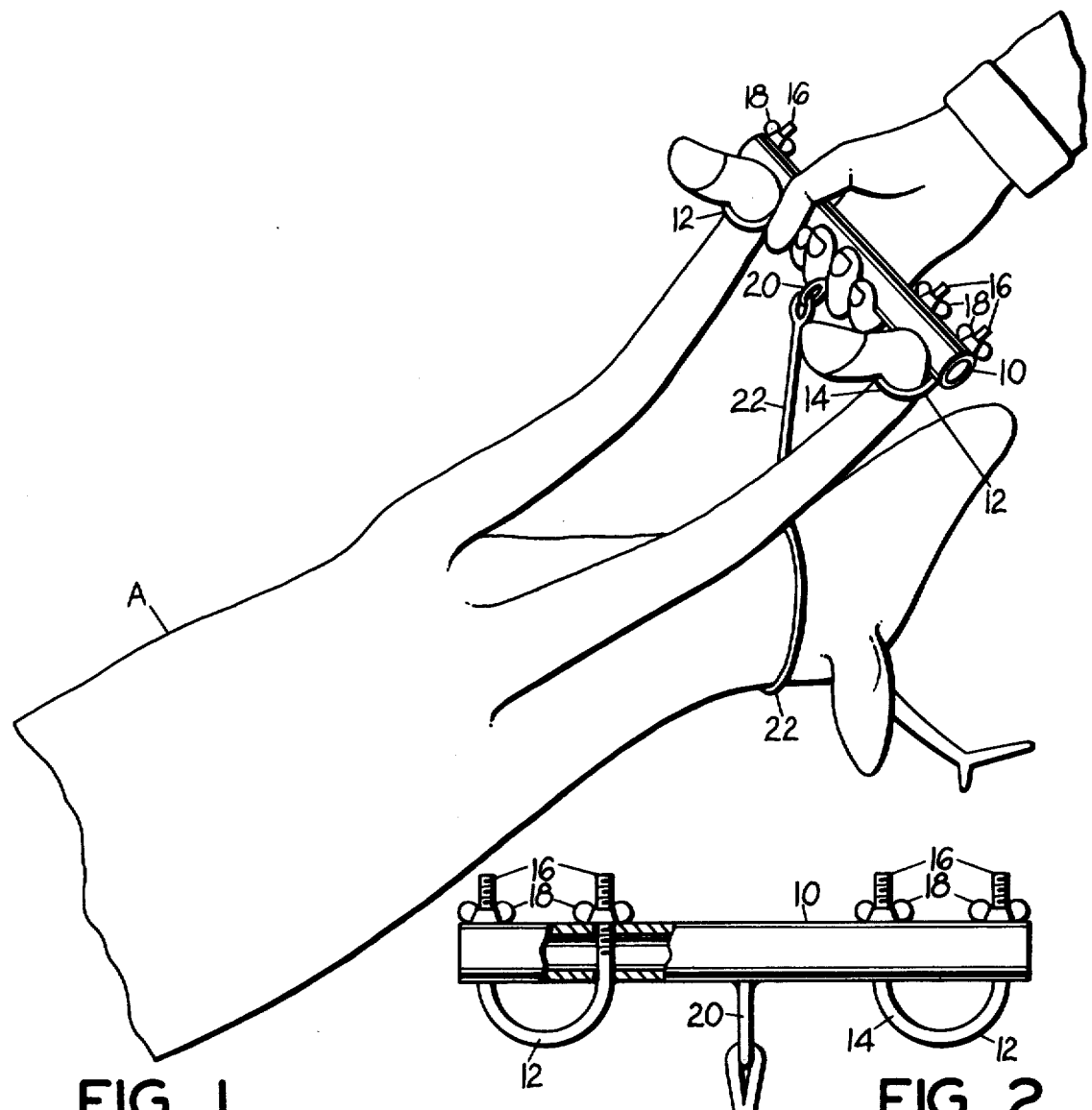
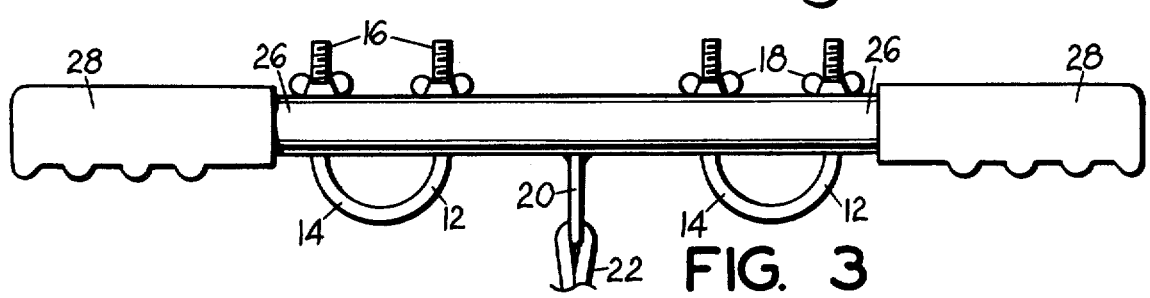

GAME DRAGGING DEVICE

BACKGROUND OF THE INVENTION

It is well known that it is difficult for hunters to remove large slain animals such as deer, elk, moose from the area in which the animal is killed since such area oftentimes comprises rough terrain and/or is a long distance from the hunter's camp or from a road. Various devices have heretofore been proposed for dragging such animals such as sleds, skids, wheel devices and other means. Such devices although performing the desired function have not possessed all the desired features of being (1) simple and economical in construction; (2) compact in size whereby to be readily carried by the hunter when not in use (3) and capable of effective securement to the animal so that the animal can be dragged with a minimum amount of effort.

SUMMARY OF THE INVENTION

According to the present invention and forming a primary objective thereof, a game dragging device is provided which overcomes the deficiencies of prior art devices by being simple and economical to manufacture, compact in its construction for easy carrying by the hunter while not in use, and capable of securement to the animal for minimum lifting and dragging effort on the part of the hunter.

In carrying out the invention, there is provided a rigid hand bar with a hand gripping area thereon and also with a pair of spaced clamp loops such as U-bolts which are adjustable for releasable securement to front leg portions of the animal. Line means are provided on the bar which are arranged to loop under and support the head portion of the animal off the ground. An animal can be dragged by one or more persons after first securing said bar to the front legs and then grasping and pulling the bar.

The invention will be better understood and additional objects and advantages will become apparent from the description taken in connection with the accompanying drawings.

BRIEF DESCRIPTION OF THE DRAWINGS

FIG. 1 is a perspective view of a game dragging device embodying the instant invention, the device being shown attached to the front legs of an animal being dragged by a hunter;

FIG. 2 is an elevational view, partly broken away, of the game dragging device of FIG. 1, FIGS. 1 and 2 showing one embodiment of the device; and FIG. 3 is an elevational view of another embodiment of the device.

DETAILED DESCRIPTION OF A PREFERRED EMBODIMENT

With particular reference to the drawings and first to FIGS. 1 and 2, a first embodiment of the game dragging device of the instant invention comprises a rigid hand bar 10 which may be formed from tubular metal bar stock, wood, or any other material of sufficient rigidity to partly lift an animal and drag it. This hand bar includes a pair of clamp loops 12 capable of having releasable clamped engagement on front leg portions of an animal A to be dragged. U-bolts serve well as the clamp loops wherein the curved body portions 14 thereof are disposed on one side of the bar and the leg portions 16 project slidably through the bar and have wing nuts 18 engageable with the threaded portions of the U-bolts on the side opposite from the body portion 14. The U-bolts are of a sufficient size so that when their wing nuts are backed off, the curved body portion thereof can be slipped over the hooves or feet of an animal. The U-bolts are also arranged such that upon tightening of the wing nuts, the curved body portion can be locked firmly on the front legs of the animal, preferably immediately behind the hoof or foot portions.

Integral with the hand bar 10 and projecting in the same direction as the curved body portions 14 is a securing eye 20 for one end of a line 22. The other end of line 22 carries a swivel snap hook 24 arranged for releasable attachment to eye 20 to form a fixed loop or arranged for slidable attachment on the rope itself to form a sliding noose.

The spacing between the clamp loops 12 is sufficient to allow the hunter to grip the bar therebetween, the eye member 20 fitting between the fingers as shown in FIG. 1. In the operation of the present device, the clamp loops 12 are secured to the front legs of the animal, as by clamping engagement of the loops immediately behind the hooves or feet, and the line 22 looped under the head or neck and secured to the eye 20 for a fixed loop or engaged on the line to provide a sliding noose. The hunter then grasps the hand bar and drags the animal.

The line 22 is of a selected length so that when it is looped under the animal's neck or head, the head will be raised off the ground so that the head will not touch the ground.

The embodiment of FIG. 3 employs the same principles as the embodiment of FIGS. 1 and 2. This embodiment, however, has extensions 26 at each end to provide end hand grips to facilitate use of the dragging device by two men. Central spacing between the clamp loops 12 is maintained, however, so that this embodiment can be used as well by a single person. The end extensions may have bicycle type hand grips 28 thereon for comfort to the hunter.

It is apparent that the present invention provides a game dragging device that is simple in construction and economical to manufacture. Also, the device is compact and can readily be carried on the person of the hunter while not in use. In addition, it is efficient in use in providing a novel connection to the animal and also contributes to efficient operation by the hunter.

It is to be understood that the forms of our invention herein shown and described are to be taken as preferred examples of the same and that various other changes in the shape, size and arrangement of parts may be resorted to without departing from the spirit of our invention, or the scope of the subjoined claims.

Having thus described our invention, we claim:

1. A game dragging device comprising
   (a) a rigid bar having opposite ends,
   (b) a pair of U-bolt clamps on said bar,
   (c) each of said clamps having leg portions extending slidably through said bar,
   (d) said clamps forming loops on one side of said bar and said leg portions projecting from the opposite side of said bar,
   (e) each of said loops projecting in the same direction from said bar and being spaced on opposite sides of the longitudinal center of the bar,
   (f) releasable fasteners adjustably engageable with the projecting leg portions of said clamps, (g) said loops being arranged to be enlarged and diminished in size by adjustment of said fasteners for receiving foot portions of a dead game animal and cinching such animal foot portions firmly up against said bar, (h) an eye portion extending integrally from said bar at about the longitudinal center thereof and in the same direction as said loops, (i) and a flexible line connected at one of its ends to said eye portion and including connecting means at its other end arranged to be secured to the neck or head portion of an animal for holding the head in elevated position while the animal is being dragged.

2. The game dragging device of claim 1 wherein said bar provides a hand gripping portion located centrally of said bar for one man operation.

3. The game dragging device of claim 1 wherein said bar provides a hand gripping portion located at opposite ends of said bar for a two man operation.